(No Model.)  2 Sheets—Sheet 1.
J. RILEY.
POTATO PLANTER.
No. 374,757. Patented Dec. 13, 1887.
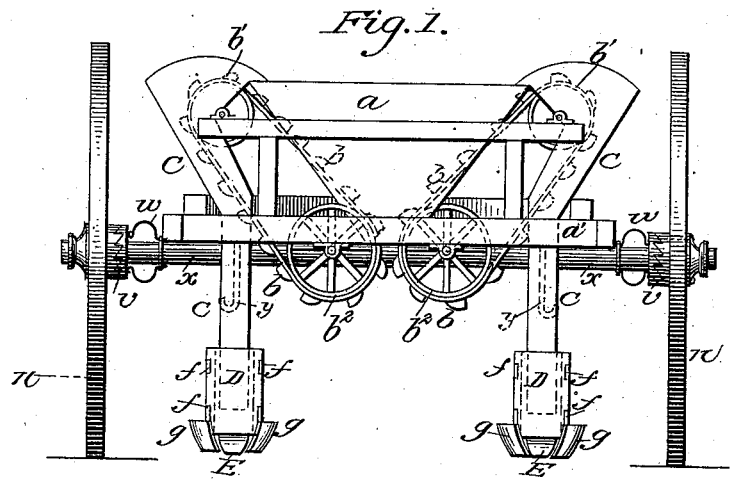
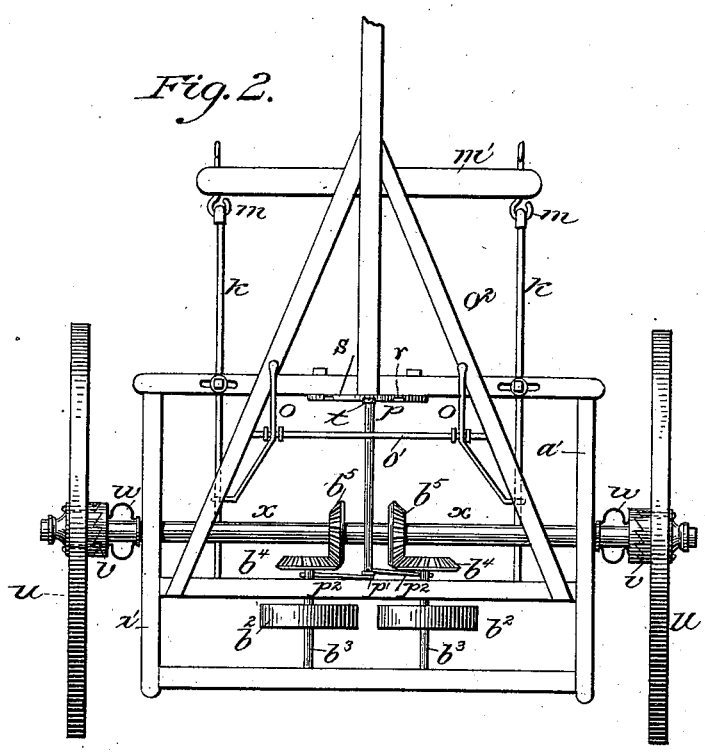
Witnesses:
Wm A. Lindsey
James B. Porter
Inventor:
John Riley (No Model.)
J. RILEY.
POTATO PLANTER.
No. 374,757.          Patented Dec. 13, 1887.
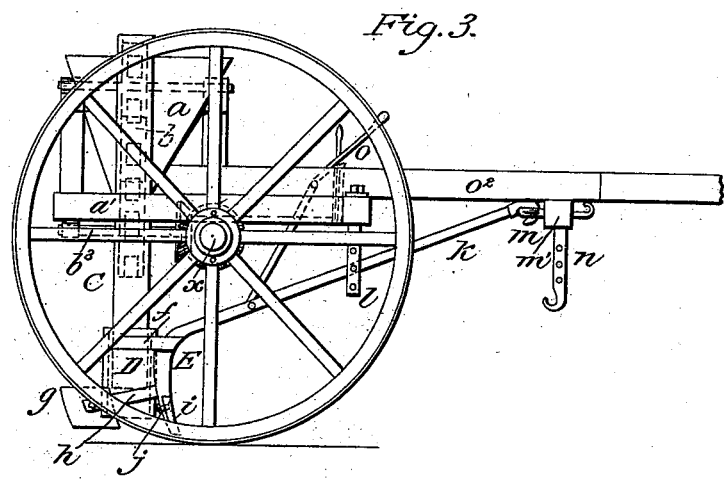
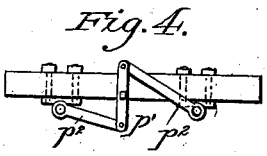
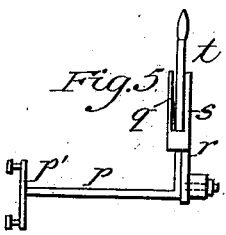
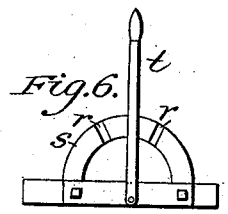
Witnesses.
W. A. Lindsey
James B. Porter
Inventor.
John Riley

UNITED STATES PATENT OFFICE.

JOHN RILEY, OF COUNCIL GROVE, KANSAS.

POTATO-PLANTER.

SPECIFICATION forming part of Letters Patent No. 374,757, dated December 13, 1887.

Application filed November 15, 1886. Serial No. 218,975. (No model.)

*To all whom it may concern:*

Be it known that I, JOHN RILEY, residing at Council Grove, State of Kansas, have invented certain new and useful Improvements in Potato-Planters, of which the following is a description.

My invention relates to machines for planting potatoes, of that class which automatically feed or plant the potatoes at regular intervals apart either in drills or hills; and it has for its object to provide a simply-constructed, easily-operated, and durable machine of the class named, in which the potatoes may be separately taken from the hopper and planted, the distance between the plants, when either drilling or planting in hills, regulated, and the feeding devices may be instantaneously thrown in or out of gear, which will automatically stop feeding or planting while the machine is being backed or turned; and it consists of the parts and combinations of parts hereinafter described and claimed.

In the accompanying drawings, forming a part of this specification, Figure 1 is a rear elevation of my improved machine; Fig. 2, a plan view, with the hopper and accompanying parts removed; Fig. 3, a side elevation; and Figs. 4, 5, and 6 detail views of the mechanism for throwing the machine out of gear.

Similar letters refer to similar parts throughout the several views.

The letter $a$ represents the hopper in which the potatoes to be planted are placed. This hopper is supported immediately in the rear of axle $x$ by a frame which projects from the main frame, $a'$, of the machine. At each end of the hopper spouts C are secured in any desired manner to the frame of the machine, the upper portions of which incline outwardly from the hopper, and the mouths of which flare so that their side walls enter the hopper through a slot formed in its upper edge. Within the mouths of the spouts pulleys $b'$ are mounted on shafts, having their bearings on the upper cross-bar of the frame which supports the hopper. Around these pulleys and through the inclined portions of the spouts and through the hopper run endless cup-belts $b$. These belts are driven by pulleys $b^2$, mounted on shafts $b^3$, having their bearings on the main frame of the machine and carrying on their inner ends beveled wheels $b^4$. (See Fig. 2.)

D represents tubes, which are attached by ears $f$ to the furrow-openers or hoes E, and which surround the lower ends of spouts C, and are sufficiently large to move up and down on the spouts to permit the hoes to accommodate themselves to the inequalities of the ground.

The hoes E are attached to or formed as a part of bars K, the upper ends of which are attached to hooks $m$, projecting from a cross-bar, $m'$, and passing through the downwardly-extending perforated stirrups $l$, by which they are held in place by pins passing through said perforations; or they may be attached to the hanging bars $n$, the adjustment of which will regulate the depth of the furrow. To the end of the hoe the steel point $i$ is attached by means of a bolt and nut, $j$, so that it may be readily removed for repair or replacement. Concave scrapers $g\ g$ are secured to the hoes by ears $h$, and follow the hoes in all their movements for the purpose of covering the potatoes with earth. Bent levers $o$ are pivoted between lugs on a bar, $o'$, having its ends secured in the tongue-braces $o^2$, the lower ends of said levers being secured to the bars K, so that when the upper or free ends of the levers are pushed down by the operator's foot the bars will be elevated to lift the hoes out of the ground or over obstructions or when turning the machine.

To the forward cross-bar of the main frame a segment, $s$, is attached, having notches $r$ therein, and projecting backward therefrom is a lever or bar, $p$, near the rear end of which an arm, $p'$, is secured, to the ends of which one end of short levers $p^2$ are pivoted, the other ends of said levers being pivoted to the shafts $b^3$, which carry the beveled cog-wheels $b^4$. At the other end of lever $p$ a hand-lever, $t$, is secured, whereby when the same is moved to the right or left the bevel-wheels $b^4$ are thrown into or out of gear with the bevel cog-wheels $b^5$, mounted on the axle $x$ of the machine, and thereby stopping the feed or working of the machine.

The shafts $b^3$ are journaled in any suitable sliding bearing to permit the operation above described, and a spring, $q$, is attached in any suitable manner to the segment $s$, to hold the lever $t$ in the notches $r$ of said segment.

Motion is communicated to the various parts through the supporting-wheels N by means of the ratchet-clutches $v$, which are held in gear with the clutch-hubs by the springs $w$. The clutches $v$ are cast with a key, which fits in a seat in the axle, so that when the planter moves forward the clutch is held in gear with the hub and the axle turned to operate the machine; but when the planter is moved backward, as in turning, the clutch slips back on the axle against the pressure exerted by the spring, and the teeth slip past each other, permitting the free rotation of the wheel without operating the machine.

Y are the hooks for suspending the hoes when the machine is being moved from place to place.

The beveled cog-wheels and the pulleys are so proportioned that the potatoes are carried up by the cups of the belts and dropped at the right distance for drilling. To plant in hills, some of the cups should be inverted, the number being regulated by the distance apart it is desired to make the hills. The inverted cups carry up no potatoes, but are left on the belt to prevent the escape of potatoes through the bottom of the hopper.

Having thus described my invention, what I claim as new, and desire to secure by Letters Patent, is—

The combination, in a machine for planting potatoes, of the wheels N, the axle $x$, the cog-wheels $b^5$, the main frame $a'$, the hopper supported thereon, the spouts C, having the inclined portions and flaring mouths, the pulleys $b'$, journaled in said mouths, the shaft $b^3$, journaled in sliding bearings, and having the pulleys $b^2$ and bevel cog-wheels $b^4$ mounted thereon, the cup-belts $b$, secured thereto, the levers $p^2$, having their ends attached to the shafts $b^3$ and to the ends of arm $p'$, the hand-lever $t$, notched segment $s$, and spring $q$, whereby the machine may be thrown out of or in gear, substantially as described.

JOHN RILEY.

Witnesses:
WM. LINDSEY,
JAMES B. SORTER.